United States Patent
Kera (10) Patent No.: US 7,791,654 B2
(45) Date of Patent: Sep. 7, 2010

(54) DIGITAL STILL CAMERA AND METHOD OF CONTROLLING SAME WITH CONTROLLED CHARGE SWEEP-OUT

(75) Inventor: Hideaki Kera, Asaka (JP)

(73) Assignee: Fujifilm Corporation, Tokyo (JP)

( * ) Notice: Subject to any disclaimer, the term of this patent is extended or adjusted under 35 U.S.C. 154(b) by 519 days.

(21) Appl. No.: 11/790,614

(22) Filed: Apr. 26, 2007

(65) Prior Publication Data

US 2007/0263117 A1    Nov. 15, 2007

(30) Foreign Application Priority Data

Apr. 27, 2006    (JP) ............................. 2006-122934

(51) Int. Cl.
*H04N 9/64* (2006.01)
(52) U.S. Cl. ...................... 348/241; 348/243; 348/246; 348/248
(58) Field of Classification Search .................. 348/243, 348/246, 248
See application file for complete search history.

(56) References Cited

U.S. PATENT DOCUMENTS

| | | | |
|---|---|---|---|
| 5,027,215 A * | 6/1991 | Takayama et al. ........... | 348/314 |
| 6,157,407 A * | 12/2000 | Kobayashi ................... | 348/241 |
| 6,831,692 B1 * | 12/2004 | Oda ............................. | 348/315 |
| 2005/0046714 A1 * | 3/2005 | Kato ........................... | 348/243 |
| 2006/0038900 A1 * | 2/2006 | Tay ............................. | 348/243 |
| 2006/0072024 A1 * | 4/2006 | Ishihara et al. .............. | 348/302 |
| 2006/0268135 A1 * | 11/2006 | Lim et al. ................... | 348/243 |

FOREIGN PATENT DOCUMENTS

JP    2004-172925 A    6/2004

\* cited by examiner

*Primary Examiner*—David L Ometz
*Assistant Examiner*—Dwight Alex C Tejano
(74) *Attorney, Agent, or Firm*—Birch, Stewart, Kolasch & Birch, LLP (57) ABSTRACT

In order to halt smear sweep-out in a case where the effects of smear charge are considered minor, it is determined whether the shutter is a high-speed shutter when a shutter-release button is pressed. If the shutter is not the high-speed shutter, a CCD is exposed and signal charge accumulates in the photodiodes of the CCD. Smear charge is swept out before the signal charge is shifted from the photodiodes to vertical transfer lines. The signal charge is thenceforth transferred to the vertical transfer lines and a video signal is output from the CCD. In the case of the high-speed shutter, smear sweep-out is halted and charge is shifted from the photodiodes to the vertical transfer lines.

5 Claims, 9 Drawing Sheets

| SHUTTER SPEED T | DARK-CURRENT AMOUNT OF CORRECTION |
|---|---|
| t11 > T | Δa1 |
| t11 ≦ T < t12 | Δa2 |
| t12 ≦ T < t13 | Δa3 |

DIGITAL STILL CAMERA AND METHOD OF CONTROLLING SAME WITH CONTROLLED CHARGE SWEEP-OUT

BACKGROUND OF THE INVENTION

1. Field of the Invention

This invention relates to a digital still camera (inclusive of a portable electronic device such as a mobile telephone having a camera function) and to a method of controlling the same.

2. Description of the Related Art

In digital still cameras that employ a solid-state electronic image sensing device, unwanted electric charge that has accumulated in a vertical transfer path is swept out before signal charge that has accumulated in photodiodes is shifted to the vertical transfer path (this is so-called "smear sweep"). If the camera has been set to a high-sensitivity image sensing mode, there are occasions where sweep-out of unwanted charge is halted (see the specification of Japanese Patent Application Laid-Open No. 2004-172925).

However, even in modes other than a high-sensitivity image sensing mode, there are also cases where the image quality of the image of the subject obtained is not much affected even if processing for sweeping out unwanted charge is halted. In such cases, transferring the signal charge that has accumulated in the photodiodes without sweeping out the unwanted charge is better in that the signal charge can be read out at higher speed.

SUMMARY OF THE INVENTION

Accordingly, an object of the present invention is to halt the sweeping out of unwanted electric charge in a case where it is believed that there will be little effect upon the quality of the image of the subject obtained.

According to the present invention, the foregoing object is obtained by providing a digital still camera comprising: a shutter-speed setting device for selectively setting a high shutter speed and a normal shutter speed; a solid-state electronic image sensing device having a number of photodiodes arrayed in row and column directions and including a vertical transfer path adjacent to each column of photodiodes; a first control device for controlling the solid-state electronic image sensing device in such a manner that the photodiodes are exposed for a period of time conforming to the shutter speed set by the shutter-speed setting device; and a second control device operable, in a case where the normal shutter speed has been set by the shutter-speed setting device, for controlling the solid-state electronic image sensing device so as to sweep out unwanted electric charge, which has accumulated in the vertical transfer path, in response to end of exposure, shift signal charge, which has accumulated in the photodiodes, to the vertical transfer path after the unwanted electric charge has been swept out, and transfer the shifted signal charge in the vertical direction to thereby output a video signal, and operable, in a case where the high shutter speed has been set by the shutter-release setting device, for controlling the solid-state electronic image sensing device so as to halt sweep-out of the unwanted electric charge, shift signal charge, which has accumulated in the photodiodes, to the vertical transfer path in response to end of exposure, and transfer the shifted signal charge in the vertical direction to thereby output a video signal.

The present invention also provides a control method suited to the digital still camera described above. More specifically, the present invention provides a method of controlling a digital still camera having a shutter-speed setting device for selectively setting a high shutter speed and a normal shutter speed, and a solid-state electronic image sensing device having a number of photodiodes arrayed in row and column directions and including a vertical transfer path adjacent to each column of photodiodes, the method comprising the steps of: controlling the solid-state electronic image sensing device by a first control device in such a manner that the photodiodes are exposed for a period of time conforming to the shutter speed set by the shutter-speed setting device; and in a case where the normal shutter speed has been set by the shutter-speed setting device, controlling the solid-state electronic image sensing device by a second control device so as to sweep out unwanted electric charge, which has accumulated in the vertical transfer path, in response to end of exposure, shift signal charge, which has accumulated in the photodiodes, to the vertical transfer path after the unwanted electric charge has been swept out, and transfer the shifted signal charge in the vertical direction to thereby output a video signal, and in a case where the high shutter speed has been set by the shutter-release setting device, controlling the solid-state electronic image sensing device by the second control device so as to halt sweep-out of the unwanted electric charge, shift signal charge, which has accumulated in the photodiodes, to the vertical transfer path in response to end of exposure, and transfer the shifted signal charge in the vertical direction to thereby output a video signal.

In accordance with the present invention, it is possible to set a high shutter speed or a normal shutter speed, with the photodiodes of a solid-state electronic image sensing device being exposed for a period of time that conforms to the speed that has been set. If the normal shutter speed has been set, unwanted electric charge that has accumulated in the vertical transfer path is swept out before signal charge that has accumulated in the photodiodes is shifted to the vertical transfer path. After the unwanted charge has been swept out, the signal charge that has accumulated in the photodiodes is shifted to the vertical transfer path, transferred in the vertical direction and output as a video signal. If the high shutter speed has been set, it is believed that unwanted charge that has accumulated in the vertical transfer path will have little effect upon the image of the subject. Sweep-out of the unwanted charge, therefore, is halted. Signal charge that has accumulated in the photodiodes is shifted to the vertical transfer path without executing processing for sweeping out unwanted charge that has accumulated in the vertical transfer path, and the shifted signal charge is transferred in the vertical direction and output as a video signal. Output of the video signal can be achieved at high speed.

The camera may further comprise a high-sensitivity photography setting device for setting high-sensitivity photography. In this case, the second control device would control the solid-state electronic image sensing device in such a manner that if the high shutter speed has been set by the shutter-speed setting device and, moreover, high-sensitivity photography has been set by the high-sensitivity photography setting device, sweep-out of the unwanted charge is halted, signal charge that has accumulated in the photodiodes is shifted to the vertical transfer path in response to end of exposure, and shifted signal charge is transferred in the vertical direction to thereby output a video signal.

The camera may further comprise an exposure calculating device for calculating amount of exposure in such a manner that amount of exposure of the photodiodes arrayed in the solid-state electronic image sensing device will be an appropriate amount of exposure; and an exposure adjusting device for adjusting amount of exposure in such a manner that the image of the subject is sensed at an amount of exposure less than the amount of exposure calculated by the exposure calculating device. In this case, the second control device would halt processing for sweeping out unwanted charge in a case where amount of exposure has been adjusted to be less than the amount of exposure calculated by the exposure calculating device and, moreover, the high shutter speed has been set by the shutter-speed setting device.

The camera may further comprise a dark-current correcting device for performing a dark-current correction using a dark-current correction amount of the solid-state electronic image sensing device, which is decided based upon the shutter speed set by the shutter-speed setting device, in response to halting of sweep-out of the unwanted charge performed under control by the second control device. The amount of dark current produced depends upon exposure time (shutter speed). Since the amount of correction of dark current changes in accordance with shutter speed, dark current can be corrected in comparatively accurate fashion.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
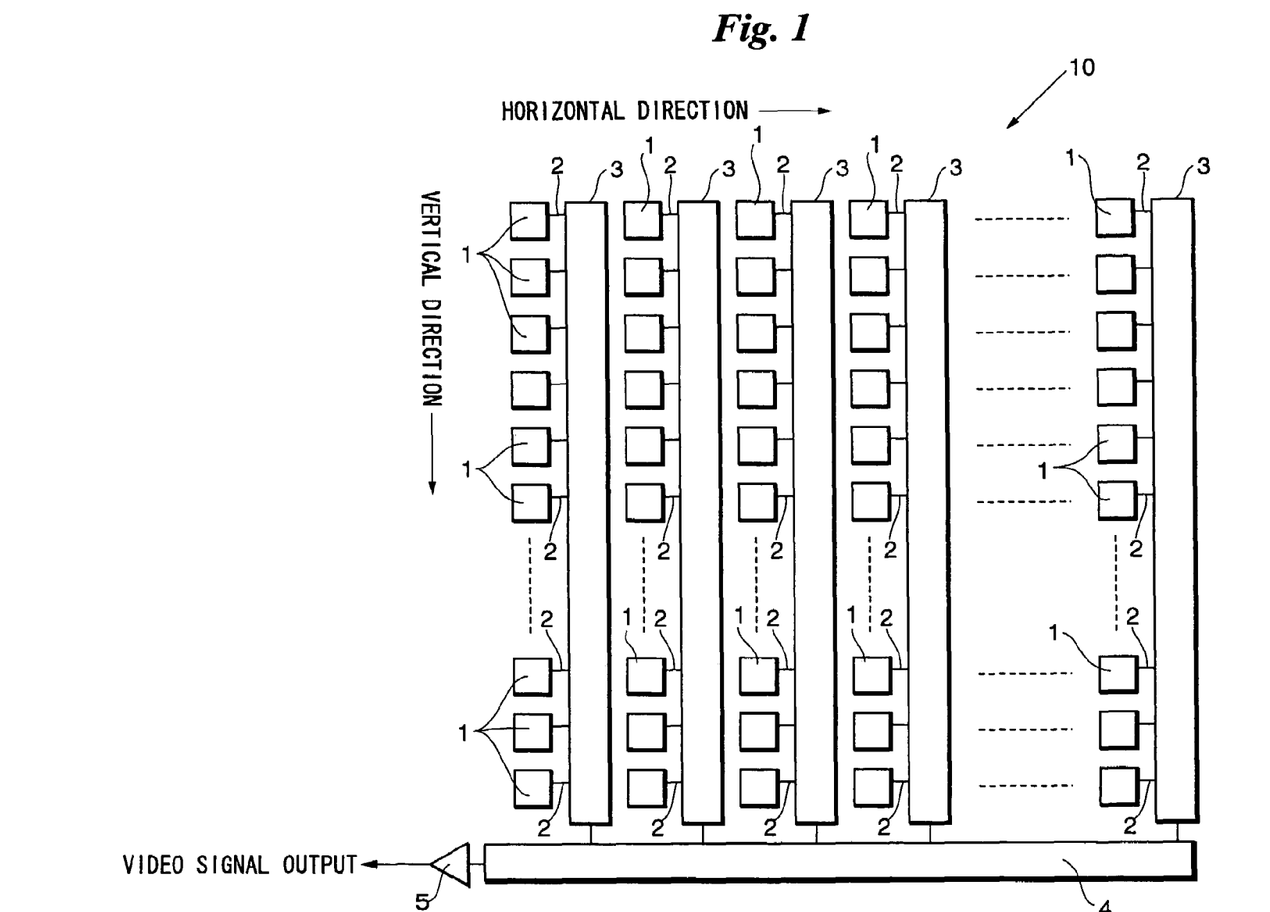
FIG. 1 is a schematic view of a CCD.

FIG. 1 is a schematic view of a CCD in an embodiment of the present invention.

A number of photodiodes 1 are arrayed in the horizontal direction (row direction) and vertical direction (column direction). Vertical transfer paths 3 for transferring signal charge in the vertical direction are provided on the right side of the photodiodes 1. Formed between each photodiode 1 and the adjacent vertical transfer path 3 is a shift gate 2 for shifting signal charge, which has accumulated in the photodiode 1, to the vertical transfer path 3.

Provided on the lower side of the vertical transfer paths 3 is a horizontal transfer path 4 for transferring horizontally the signal charge that has been transferred from the vertical transfer paths 3. An amplifier circuit 5 is connected to the left end of the horizontal transfer path 4.

Signal charge accumulates in the photodiodes 1 during exposure time, which is decided by the shutter speed. Signal charge that has accumulated in the photodiodes 1 is applied to the vertical transfer paths 3 via the shift gates 2. The signal charge is transferred in the vertical direction and input to the horizontal transfer path 4. The signal charge is transferred through the horizontal transfer path 4 in the horizontal direction and is amplified and output as a video signal by the amplifier circuit 5.

When the image of high-luminance subject is sensed, there are instances where signal charge that has accumulated in the photodiodes 1 leaks into the adjacent vertical transfer path 3. (This phenomenon is referred to as "smear", and signal charge produced by smear shall be referred to as "smear signal charge".) As a result of smear, vertical streaks of light may appear in the image represented by the video signal obtained from the CCD 10. In order to eliminate such streaks of light, there are instances where smear signal charge that has accumulated in the vertical transfer paths 3 is removed before the signal charge that has accumulated in the photodiodes 1 is shifted to the vertical transfer paths 3 (this is sweep-out of unwanted charge).

In this embodiment, unwanted charge is swept out when a subject is shot at normal shutter speed. When a subject is shot at high shutter speed, however, the amount of unwanted charge that accumulates in the vertical transfer paths 3 is considered to be small and the influence of the unwanted charge on the image of the subject is considered to be minor. At such time, therefore, sweep-out of unwanted charge is not performed. The video signal is thus obtained rapidly.

Figure 2:
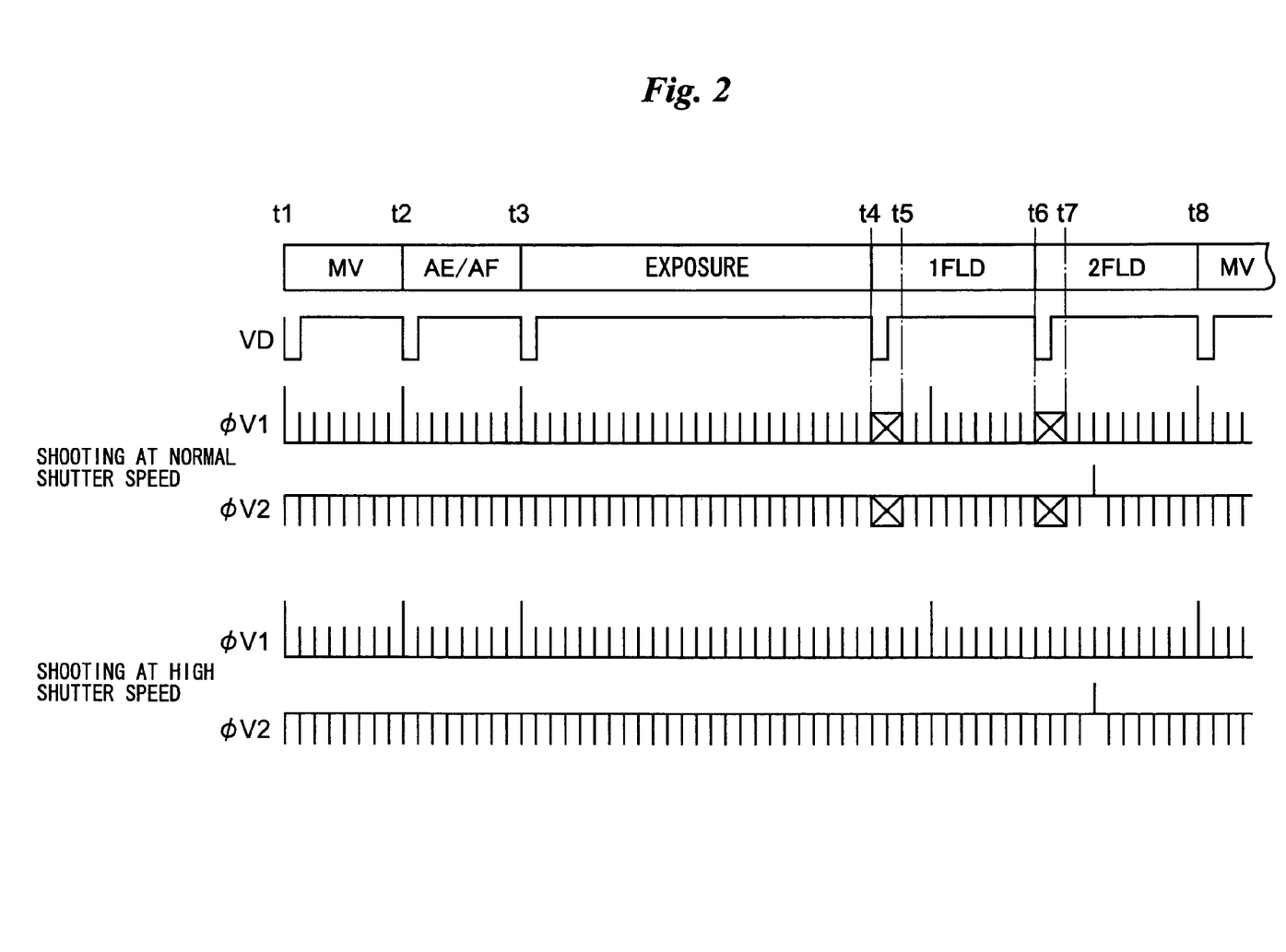
FIG. 2 is a timing chart of signals that prevail when picture taking is performed.

FIG. 2 is a timing chart at the time of photography.

A subject is shot in the period from time t1 to time 2. The image of the subject is obtained as a moving picture (or so-called "through-image"). In response to pressing of a shutter-release button, automatic exposure adjustment and automatic focus control that include calculation of amount of exposure and calculation of the in-focus position of the imaging lens are carried out using the video signal representing the image of the subject obtained in the period from time t2 to time t3. Next, the photodiodes 1 of the CCD 10 are exposed from time t3 to time t4. At time t4 when exposure ends, a mechanical shutter in front of the photoreceptor surface of the CCD 10 is closed to shut off the CCD 10 light. In the period from time t1 to time t4, vertical transfer pulses φV1 and φV2 are applied in like fashion to the vertical transfer paths 3 regardless of whether the shutter speed is the normal shutter speed or the high shutter speed. As a result, unwanted charge that has accumulated in the vertical transfer paths 3 is swept out successively. A so-called VD signal serving as a reference is also applied to the CCD 10.

In a case where a subject is shot at the normal shutter speed, high-speed vertical transfer pulses φV1 and φV2 are applied from time t4 to time t5 and the so-called smear charge that has accumulated in the vertical transfer paths 3 is swept out at high speed as unwanted charge (this is sweep-out of unwanted charge). As a result, the effects of smear charge are diminished. A field shift pulse is applied to the shift gates 2 of the odd-numbered columns at time t5. When this is done, signal charge that has accumulated in the photodiodes 1 of the odd-numbered columns is shifted to the vertical transfer paths 3. The vertical transfer pulses φV1 and φV2 are applied to the vertical transfer paths 3 from time t5 to time t6, whereby the signal charge that has accumulated in the photodiodes 1 of the odd-numbered rows is transferred in the vertical direction. The signal charge is output via the horizontal transfer path 4 as a video signal of a first field.

At time t6, the high-speed vertical transfer pulses φV1 and φV2 are applied to the vertical transfer paths 3 again until time t7. Smear charge that has accumulated in the vertical transfer paths 3 is swept out at high speed. At time t7, field shift pulses are applied to the shift gates 2 of the even-numbered columns and signal charge that has accumulated in the photodiodes 1 of the even-numbered columns is shifted to the vertical transfer paths 3. The vertical transfer pulses φV1 and φV2 are applied to the vertical transfer paths 3 from time t7 to time t8, whereby the signal charge is transferred in the vertical direction. The signal charge is output from the CCD 10 via the horizontal transfer path 4 as a video signal of a second field.

The subject is shot again and a through-image is obtained from time t8 onward.

If a subject is shot at a high shutter speed, sweep-out of unwanted charge using the high-speed vertical transfer pulses φV1 and φV2 is not performed, unlike the case where a subject is shot at the normal shutter speed. When time t4 arrives, field shift pulses are applied to the shift gates 2 of odd-numbered columns. Signal charge that has accumulated in the photodiodes 1 of the odd-numbered columns is shifted to the vertical transfer paths 3. The high-speed vertical transfer pulses φV1 and φV2 are applied to vertical transfer paths 3 from time t4 to time t6, whereby the signal charge is transferred in the vertical direction. Thereafter, in a manner similar to that described above, the signal charge is output from the CCD 10 as the first field of the video signal. When time t6 arrives, field shift pulses are applied to the shift gates 2 of the even-numbered columns and signal charge that has accumulated in the photodiodes 1 of the even-numbered columns is shifted to the vertical transfer paths 3. The vertical transfer pulses φV1 and φV2 are applied to the vertical transfer paths 3 from time t6 to time t7, whereby the signal charge is transferred in the vertical direction. The signal charge is thenceforth output from the CCD 10 as the second field of the video signal.

Figure 3:
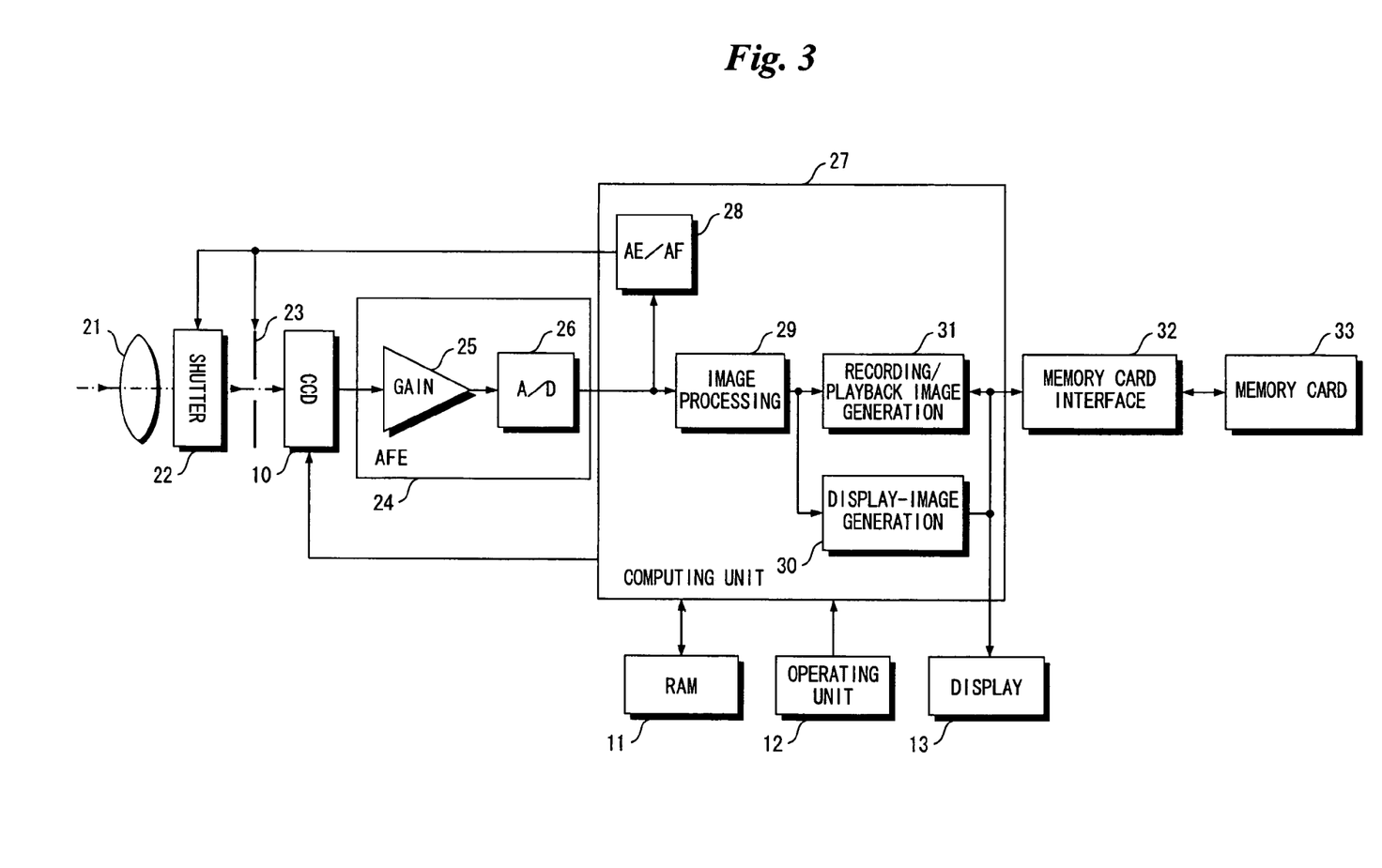
FIG. 3 is a block diagram illustrating the electrical structure of a digital still camera.

FIG. 3 is a block diagram illustrating the electrical structure of the digital still camera.

The digital still camera includes a computing unit 27. Connected to the computing unit 27 is a RAM 11 for storing prescribed data temporarily. The computing unit 27 is supplied with operating signals from an operating unit 12 that includes a shutter-release button, a power button, a menu button, an AE (automatic exposure control) button, an exposure correction button and an iris-priority button. A display unit 13 also is connected to the computing unit 27.

Light rays representing the image of the subject are converged by an imaging lens 21 and impinge upon the photoreceptor surface of the CCD 10 via a mechanical shutter 22 and iris 23. A video signal representing the image of the subject is output from the CCD 10 and enters a gain adjusting circuit 25 of an analog front end 24. The gain adjusting circuit 25 raises the gain of the video signal and inputs the resultant signal to an analog/digital converting circuit 26. The higher the shooting sensitivity is set, the higher the gain is made in comparison with the case where the normal shooting sensitivity is set. The analog/digital converting circuit 26 converts the video signal to digital image data. The digital image data obtained by the conversion is input to the computing unit 27.

The digital image data that has been input to the computing unit 27 enters an image processing circuit 29 and is subjected to prescribed image processing such as a gamma correction and white balance adjustment. Image data that is output from the image processing circuit 29 is applied to a display-image generating circuit 30. This circuit applies conversion processing of an amount of data as will be displayed on the display unit 13. Image data that is output from the display-image generating circuit 30 is applied to the display unit 13, whereby the image of the subject obtained by shooting is displayed on the display screen (this is the above-mentioned through-image).

If the shutter-release button is pressed, the image data that has been output from the analog/digital converting circuit 26 is input to automatic exposure/automatic focus control circuit 28. On the basis of the image data applied thereto, the automatic exposure/automatic focus control circuit 28 calculates an amount of exposure such that the image of the subject will be exposed appropriately and calculates the in-focus position of the imaging lens 21 such that the image of the subject will be formed on the photoreceptor surface of the CCD 10. If automatic exposure/automatic focus control has been set by the operating unit 12, then shutter speed (electronic shutter) of the CCD 10 and the f-stop value of the iris 23 are set in such a manner that the amount of exposure will be the calculated amount of exposure. The imaging lens 21 is positioned at the in-focus position that has been calculated.

Thereafter, as mentioned above, control of the CCD 10 (i.e., whether or not processing for sweeping out smear charge that has accumulated in the vertical transfer paths 3 of the CCD 10 is executed) differs depending upon whether the normal shutter speed or the high shutter speed has been set. The image data that has been input to the computing unit 27 is applied to a recording/playback image generating circuit 31 via the image processing circuit 29. The circuit 31 subjects the image data to prescribed processing such as data compression for generating an image for recording. Image data that is output from the recording/playback image generating circuit 31 is applied to and recorded on a memory card 33 via a memory card interface 32.

The digital still camera according to this embodiment also has a playback function. Image data that has been recorded on the memory card 33 is read and input to the recording/playback image generating circuit 31 via the memory card interface 32. The recording/playback image generating circuit 31 subjects the image data to prescribed playback processing such as data expansion and outputs the processed image data. The image data that has been output from the recording/playback image generating circuit 31 is applied to the display unit 13. The image represented by the image data that has been recorded on the memory card 33 is displayed on the display screen of the display unit 13.

Figure 4:
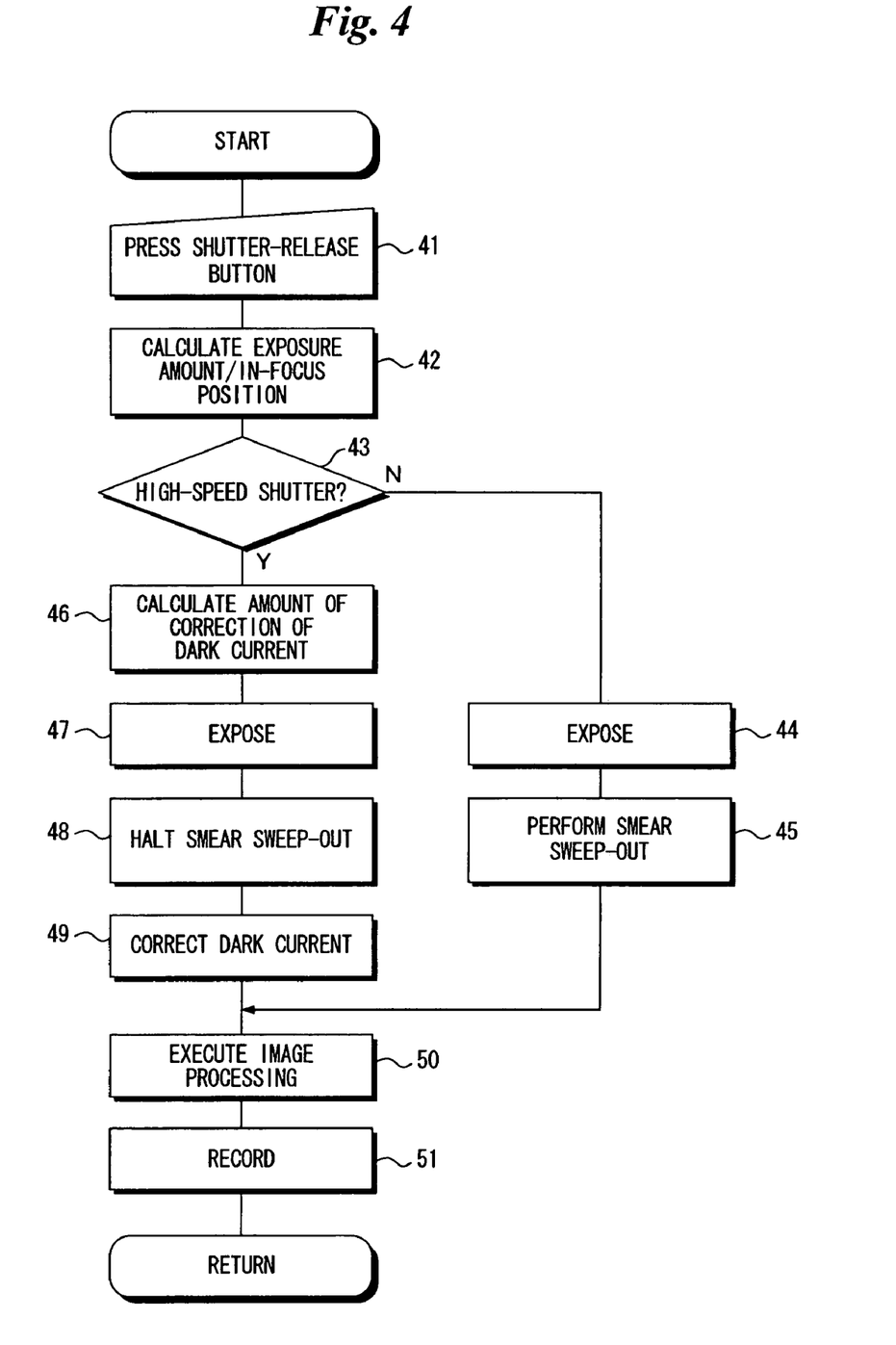
FIGS. 4 to 7 are flowcharts illustrating processing executed by the digital still camera.

FIG. 4 is a flowchart illustrating recording processing executed by the digital still camera.

If the shutter-release button is pressed (it goes without saying that this button may be of the two-stroke type) (step 41), amount of exposure and in-focus position are calculated (step 42) based upon the image data obtained by shooting the subject, as described above.

Next, it is determined whether the shutter speed is the high speed (e.g., 1/500 of a second or greater) (step 43). The shutter speed may be calculated in automatic exposure control, as mentioned above, or may be set by the user in the case of a shutter-speed priority mode or manual mode.

If the shutter speed is not the high speed (e.g., 1/500 of a second or greater) ("NO" at step 43), then the CCD 10 is exposed for a period of time that conforms to the shutter speed (step 44). When exposure ends, the mechanical shutter 22 is closed and the photoreceptor surface of the CCD 10 is shielded from light. Smear sweep-out is performed as mentioned above in the state in which the photoreceptor surface of the CCD 10 is cut off from light (step 45). The above-described image processing is then executed (step 50) and image data representing the image of the subject is recorded on a memory card (step 51).

If the shutter speed is the high speed ("YES" at step 43), then the amount of correction of dark current is calculated (step 46). The CCD 10 is then exposed for a period of time conforming to the shutter speed (step 47). In a case where the shutter speed is the high speed, the camera is set in such a manner that smear sweep-out is halted, as mentioned above (step 48). The image data obtained as set forth above is subjected to a dark-current correction by the image processing circuit 29 based upon the amount of correction calculated (step 49). The above-described image processing is then executed (step 50) and the image data representing the image of the subject is recorded on the memory card (step 51).

Figure 5:
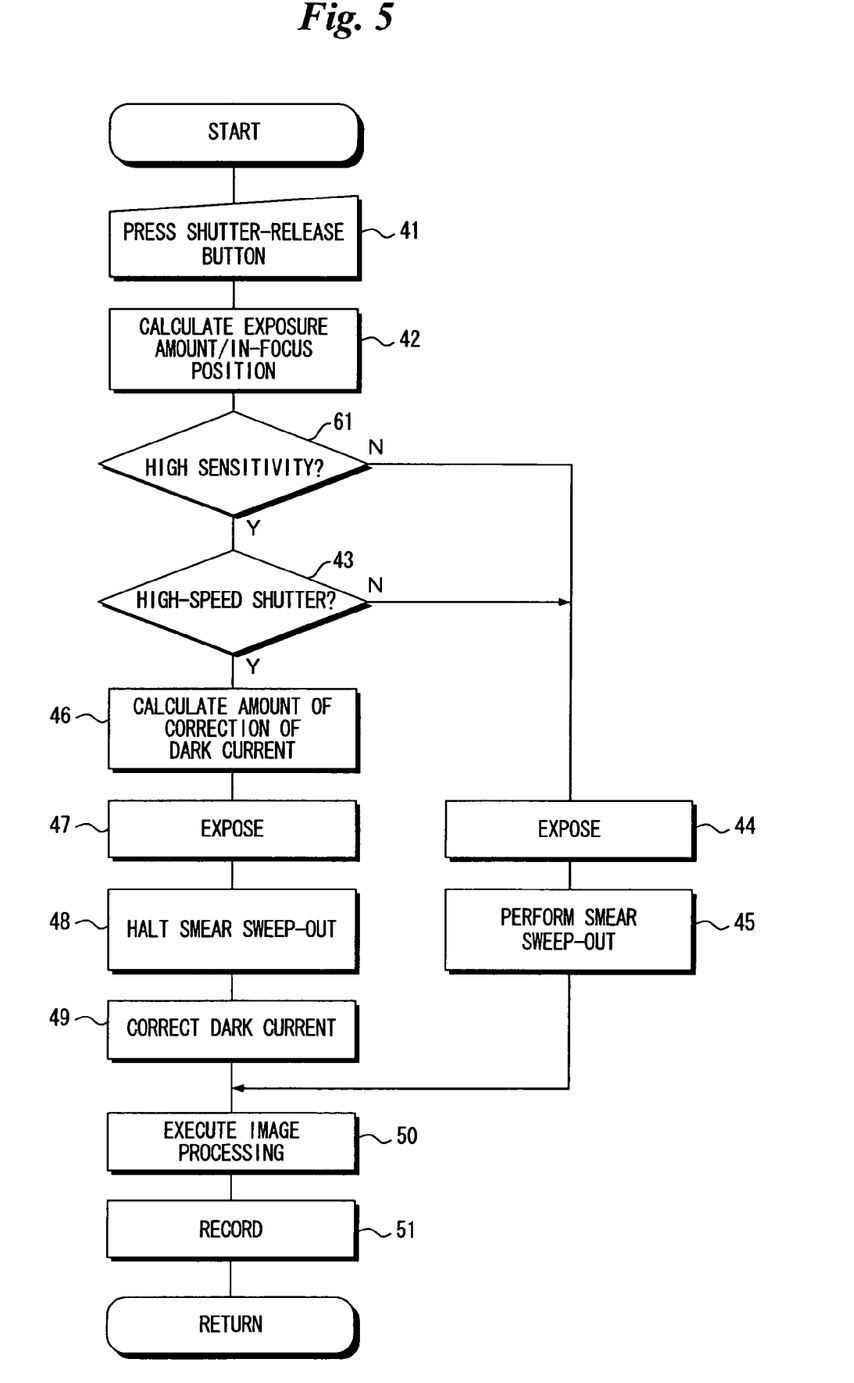

FIG. 5 is a flowchart illustrating recording processing according to another embodiment of the present invention. Processing identical with that shown in FIG. 4 is designated by like processing steps and need not be described again.

In this embodiment, a determination as to whether shooting will be performed with high-sensitivity photography (e.g., ISO 1600 or greater) (step 61) is made before the determination as to whether the shutter is the high-speed shutter. If the photography is not high-sensitivity photography ("NO" at step 61), then smear sweep-out is performed without making a transition to the determination concerning the high-speed shutter. By way of example, the setting of high-sensitivity photography is performed by displaying a menu utilizing a menu button and then using a sensitivity setting in the menu.

Figure 6:
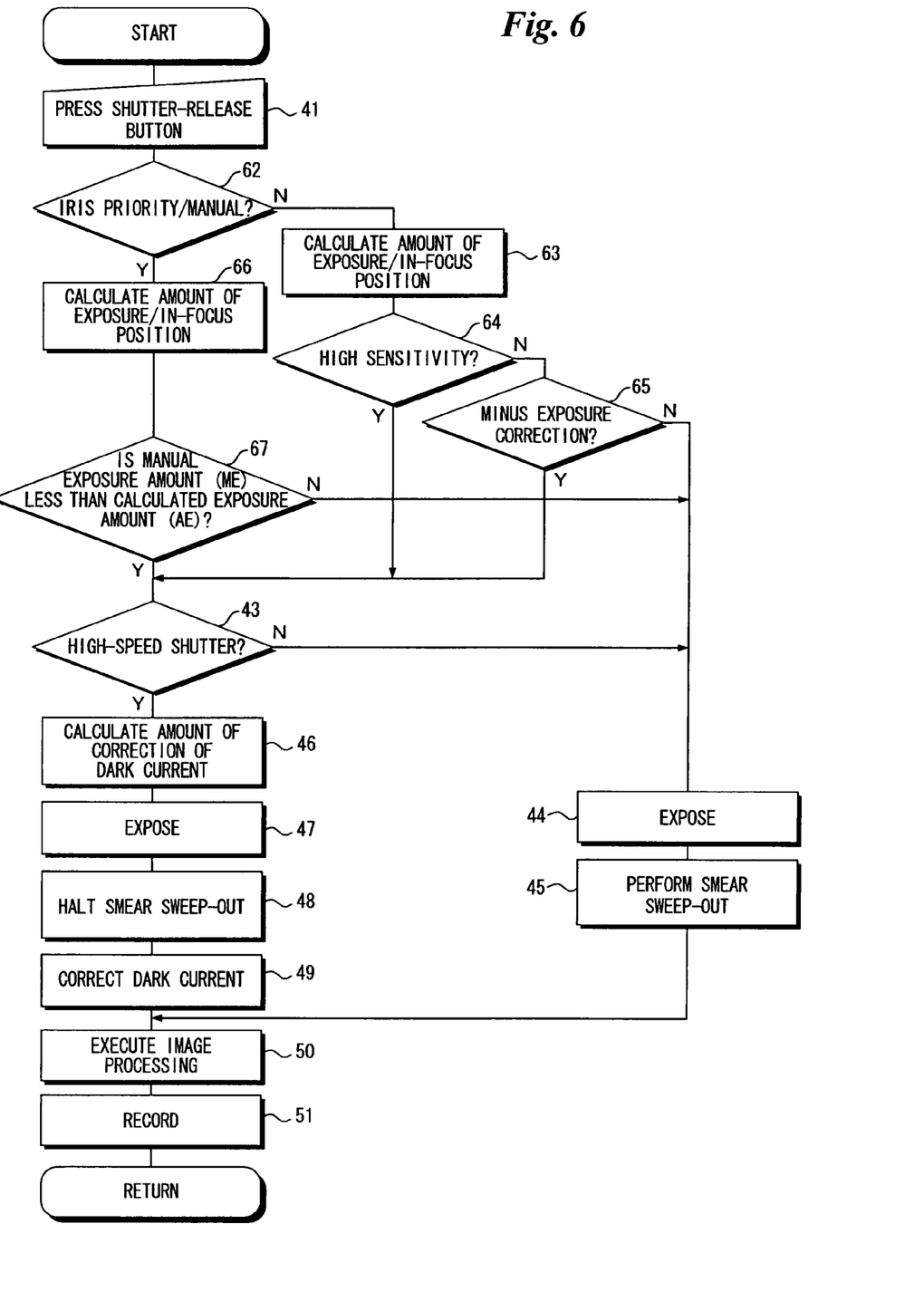

FIG. 6 is a flowchart illustrating recording processing according to a further embodiment of the present invention. Processing identical with that shown in FIGS. 4 and 5 is designated by like processing steps and need not be described again.

In this embodiment, it is determined whether the iris-priority mode or manual mode has been set (step 62). If the iris-priority mode or manual mode has been set ("YES" at step 62), amount of exposure and in-focus position are calculated in the automatic exposure/automatic focus control circuit 28 (step 66). The calculated exposure amount (AE) is compared with the exposure amount (ME) set in the iris-priority mode or manual mode. If the exposure amount (ME) (exposure-amount adjustment) set in the iris-priority mode or manual mode is smaller than the calculated exposure amount (AE) ("YES" at step 67), then it is construed that the image of the subject is darker than that obtained by automatic exposure control. The image obtained by shooting, therefore, is believed to be little influenced by the effects of smear charge and, in case of the high-speed shutter ("YES" at step 43), smear sweep-out is halted (step 48). If the exposure amount (ME) (exposure-amount adjustment) set in the iris-priority mode or manual mode is smaller than the calculated exposure amount (AE), smear sweep-out may be halted without making the determination concerning the high-speed shutter.

If the exposure amount (ME) set manually is greater than the calculated exposure amount (AE) ("NO" at step 67), then the image of the subject is comparatively bright and, hence, the effects of smear cannot be ignored. Accordingly, smear sweep-out is performed (step 45).

If the iris-priority mode or manual mode has not been set ("NO" at step 62), then amount of exposure and in-focus position are calculated in the automatic exposure/automatic focus control circuit 28 (step 63). Whether photography is high-sensitivity photography is determined (step 64). If photography is not high-sensitivity photography ("NO" at step 64), then it is determined whether a minus exposure correction has been set (step 65). If high-sensitivity photography has been set ("YES" at step 64) or if a minus exposure correction has been set ("YES" at step 65) (exposure-amount correction), then the subject is dark (in case of the high-sensitivity photography) or the amount of exposure is less than the exposure amount (AE) calculated in automatic exposure control (in case of the minus exposure correction). Therefore, in the case of the high-speed shutter ("YES" at step 43), smear sweep-out is halted (step 48).

In the above-described embodiment, it can be so arranged that in the case where the exposure amount has been set manually ("YES" at step 62), the case where photography is high-sensitivity photography ("YES" at step 64) and the case where the minus exposure correction is carried out ("YES" at step 65), smear sweep-out is performed irrespective of whether the high-speed shutter has been set.

Since the effects of smear cannot be ignored also in a case where the minus exposure correction is not performed ("NO" at step 65), smear sweep-output is performed in this case as well (step 45).

Figure 7:
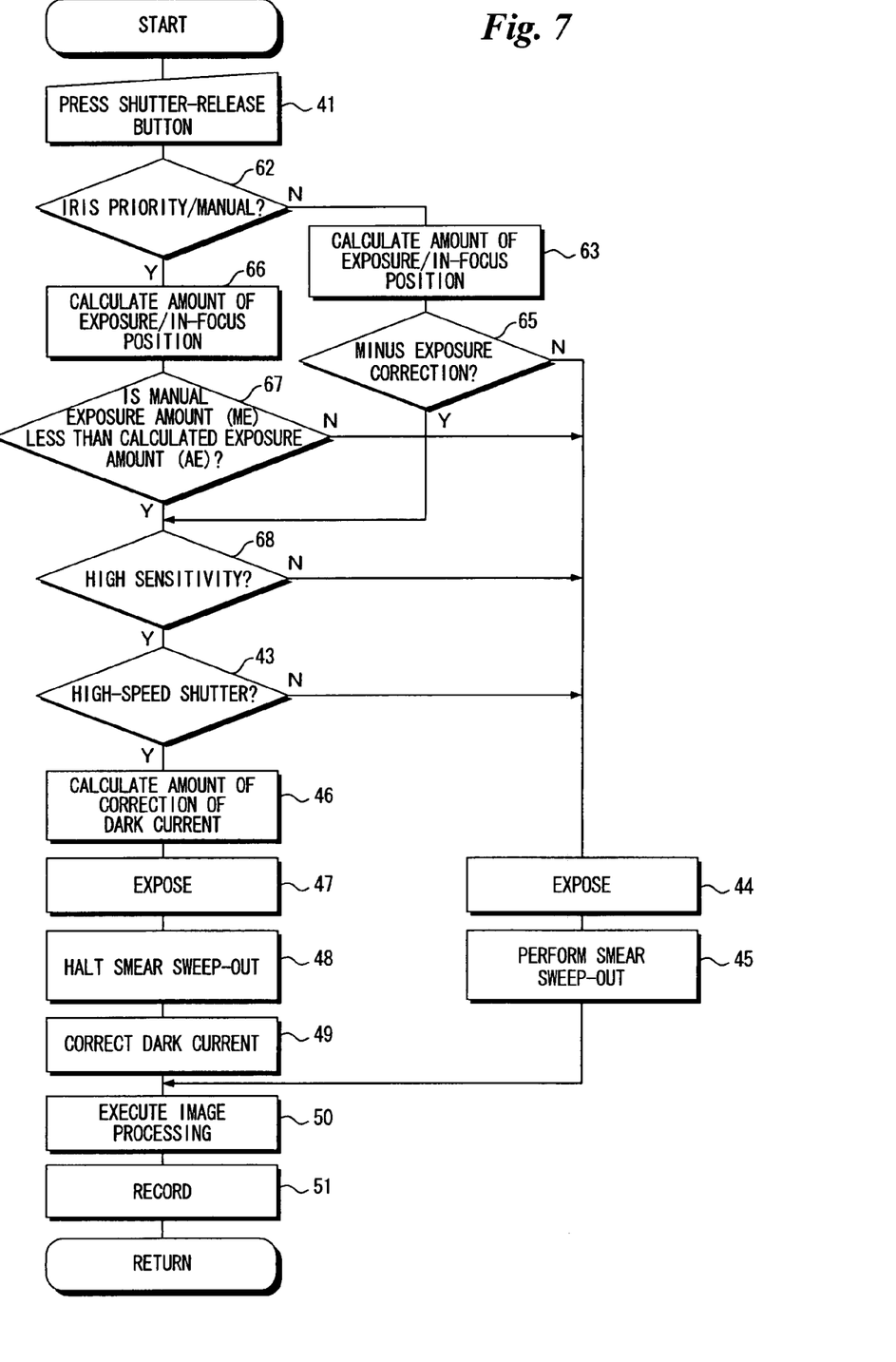

FIG. 7 is a flowchart illustrating recording processing by the digital still camera according to still another embodiment of the present invention. Processing identical with that shown in FIGS. 4 to 6 is designated by like processing steps and need not be described again.

In this embodiment, whether photography is high-sensitivity photography is determined (step 68) in a case where the manual exposure amount (ME) is smaller than the calculated exposure amount (AE) ("YES" at step 67). In a case where high-sensitivity photography has been set ("YES" at step 68), smear read-out is halted (step 48) if the high-speed shutter has been set ("YES" at step 43). In a case where high-sensitivity photography has not been set ("NO" at step 68), smear read-out is performed (step 45).

Figure 8:
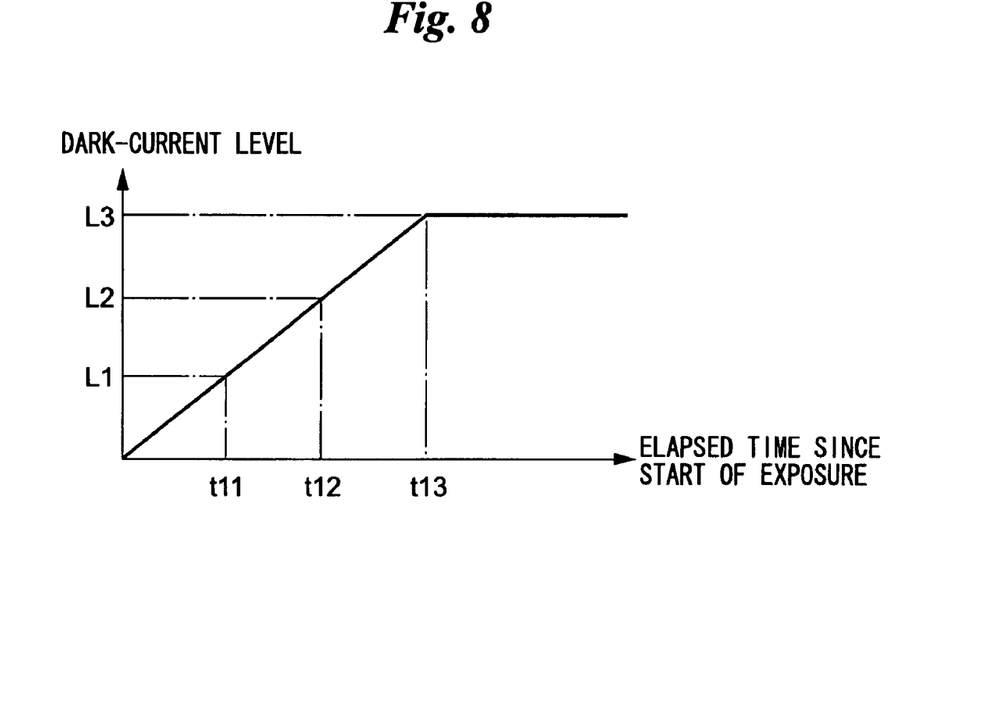
FIG. 8 illustrates the relationship between elapsed time since start of exposure and dark-current level.
Figure 9:
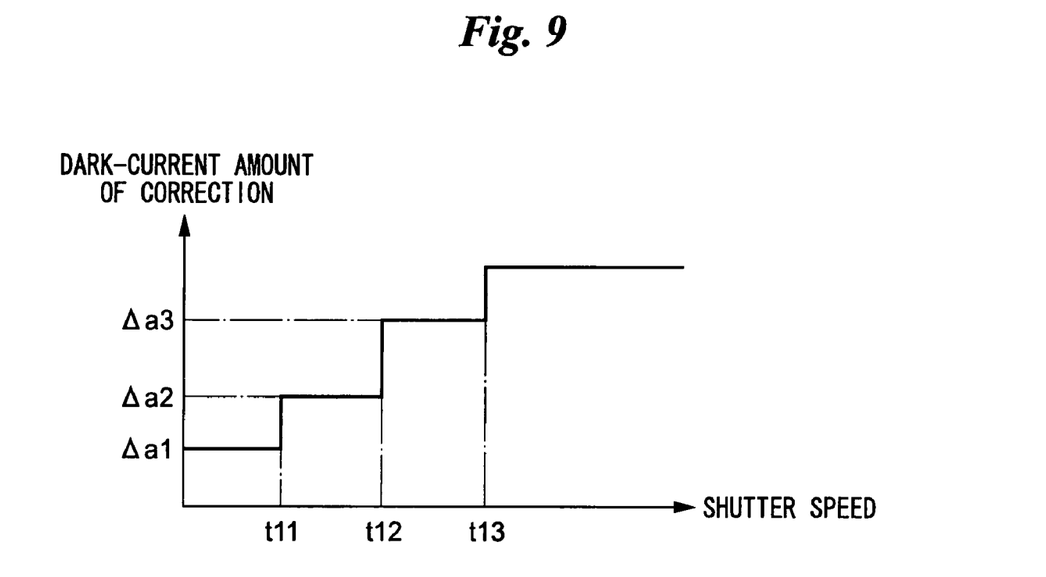
FIGS. 9 and 10 illustrates the relationship between shutter speed and dark-current correction amount.
Figure 10:
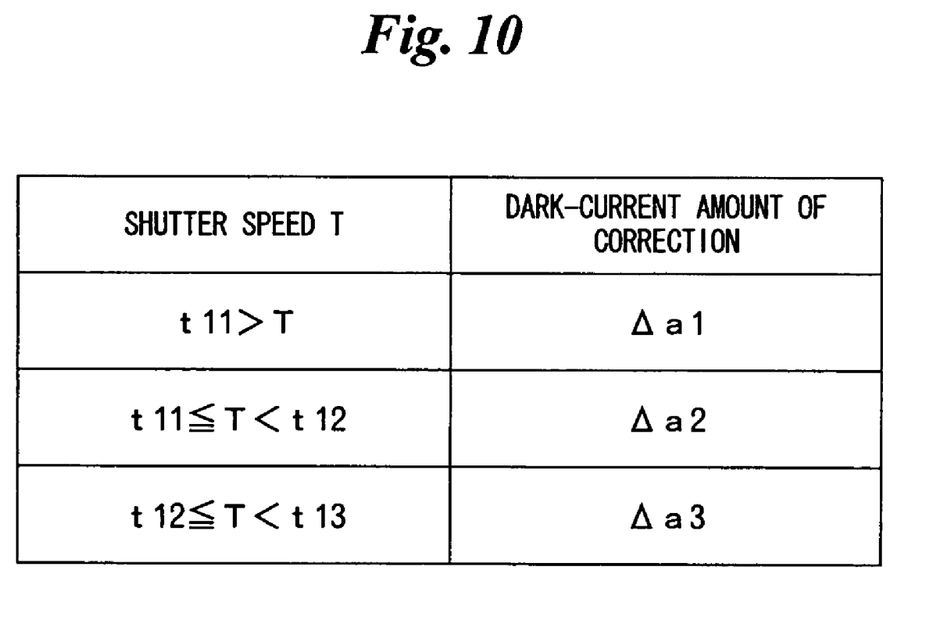

A further embodiment is illustrated in FIGS. 8 to 10.

An amount of correction of dark current is calculated according to this embodiment.

FIG. 8 illustrates the relationship between elapsed time since start of exposure and dark-current level.

The longer elapsed time up to times t11, t12, t13 from the start of exposure, the higher the level of the dark current. For example, the levels of the dark currents at times t11, t12, t13 are L1, L2, L3, respectively. When time t13 is exceeded, the level of the dark current is substantially L3.

In calculation of the amount of correction of dark current, the amount of correction is changed in accordance with the shutter speed.

FIG. 9 illustrates the relationship between shutter speed and amount of correction of dark current, and FIG. 10 is a table illustrating this relationship.

Let $\Delta a1$ represent the amount of correction up to a shutter speed of t11 (e.g., $1/2000$ of a second), $\Delta a2$ the amount of correction from shutter speed t11 to t12 (e.g., $1/1000$ of a second), and $\Delta a3$ the amount of correction from shutter speed t13 (e.g., $1/500$ of a second) onward. Here $\Delta a1 < \Delta a2 < \Delta a3$ holds and $\Delta a1 < L1 < \Delta a2 < L2 < \Delta a3 < L3$ holds. Since the amount of correction of dark current is thus decided in accordance with shutter speed, the correction of dark current can be performed in comparatively accurate fashion.

As many apparently widely different embodiments of the present invention can be made without departing from the spirit and scope thereof, it is to be understood that the invention is not limited to the specific embodiments thereof except as defined in the appended claims.

What is claimed is:
1. A digital still camera comprising:
a shutter-speed setting device for selectively setting a high shutter speed and a normal shutter speed;
a solid-state electronic image sensing device having a number of photodiodes arrayed in row and column directions and including a vertical transfer path adjacent to each column of photodiodes;
a first control device for controlling said solid-state electronic image sensing device in such a manner that the photodiodes are exposed for a period of time conforming to the shutter speed set by said shutter-speed setting device;

a second control device operable, in a case where the normal shutter speed has been set by said shutter-speed setting device, for controlling said solid-state electronic image sensing device so as to sweep out unwanted electric charge, which has accumulated in the vertical transfer path, in response to end of exposure, shift signal charge, which has accumulated in the photodiodes, to the vertical transfer path after the unwanted electric charge has been swept out, and transfer the shifted signal charge in the vertical direction to thereby output a video signal, and operable, in a case where the high shutter speed has been set by said shutter-release setting device, for controlling said solid-state electronic image sensing device so as to halt sweep-out of the unwanted electric charge, shift signal charge, which has accumulated in the photodiodes, to the vertical transfer path in response to end of exposure, and transfer the shifted signal charge in the vertical direction to thereby output a video signal, an exposure adjusting device for adjusting an amount of exposure in such a manner that the image of the subject is sensed at an amount of exposure less than an appropriate amount of exposure; and wherein said second control device halts processing for sweeping out unwanted charge in a case where amount of exposure has been adjusted to be less than the amount of exposure calculated by said exposure calculating device and the high shutter speed has also been set by said shutter-speed setting device.

2. The camera according to claim 1, further comprising a high-sensitivity photography setting device for setting high-sensitivity photography;

wherein said second control device controls said solid-state electronic image sensing device in such a manner that if the high shutter speed has been set by said shutter-speed setting device and, moreover, high-sensitivity photography has been set by said high-sensitivity photography setting device, sweep-out of the unwanted charge is halted, signal charge that has accumulated in the photodiodes is shifted to the vertical transfer path in response to end of exposure, and shifted signal charge is transferred in the vertical direction to thereby output a video signal.

3. The camera according to claim 1, further comprising:

an exposure calculating device for calculating amount of exposure in such a manner that amount of exposure of the photodiodes arrayed in said solid-state electronic image sensing device will be an appropriate amount of exposure; and an exposure adjusting device for adjusting amount of exposure in such a manner that the image of the subject is sensed at an amount of exposure less than the amount of exposure calculated by said exposure calculating device;

wherein said second control device halts processing for sweeping out unwanted charge in a case where amount of exposure has been adjusted to be less than the amount of exposure calculated by said exposure calculating device and, moreover, the high shutter speed has been set by said shutter-speed setting device.

4. The camera according to claim 1, further comprising a dark-current correcting device for performing a dark-current correction using a dark-current correction amount of said solid-state electronic image sensing device, which is decided based upon the shutter speed set by said shutter-speed setting device, in response to halting of sweep-out of the unwanted charge performed under control by said second control device.

5. A method of controlling a digital still camera having a shutter-speed setting device for selectively setting a high shutter speed and a normal shutter speed, and a solid-state electronic image sensing device having a number of photodiodes arrayed in row and column directions and including a vertical transfer path adjacent to each column of photodiodes, said method comprising the steps of:

controlling the solid-state electronic image sensing device by a first control device in such a manner that the photodiodes are exposed for a period of time conforming to the shutter speed set by the shutter-speed setting device;

in a case where the normal shutter speed has been set by the shutter-speed setting device, controlling the solid-state electronic image sensing device by a second control device so as to sweep out unwanted electric charge, which has accumulated in the vertical transfer path, in response to end of exposure, shift signal charge, which has accumulated in the photodiodes, to the vertical transfer path after the unwanted electric charge has been swept out, and transfer the shifted signal charge in the vertical direction to thereby output a video signal, and in a case where the high shutter speed has been set by the shutter-release setting device, controlling the solid-state electronic image sensing device by the second control device so as to halt sweep-out of the unwanted electric charge, shift signal charge, which has accumulated in the photodiodes, to the vertical transfer path in response to end of exposure, and transfer the shifted signal charge in the vertical direction to thereby output a video signal, adjusting an amount of exposure by an exposure adjusting device in such a manner that the image of the subject is sensed at an amount of exposure less than an appropriate amount of exposure; and halting processing for sweeping out unwanted charge by said second control device in a case where an amount of exposure has been adjusted to be less than the amount of exposure calculated by said exposure calculating device and the high shutter speed has also been set by said shutter-speed setting device.

* * * * *